(12) United States Patent
Maeda et al.

(10) Patent No.: US 11,325,262 B2
(45) Date of Patent: May 10, 2022

(54) ROBOT, ROBOT CONTROL SYSTEM, ROBOT CONTROL METHOD, AND NON-TRANSITORY STORAGE MEDIUM

(71) Applicant: CASIO COMPUTER CO., LTD., Tokyo (JP)

(72) Inventors: Maki Maeda, Mitaka (JP); Toshihiko Otsuka, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 190 days.

(21) Appl. No.: 16/212,304

(22) Filed: Dec. 6, 2018

(65) Prior Publication Data
US 2019/0193279 A1 Jun. 27, 2019

(30) Foreign Application Priority Data

Dec. 22, 2017 (JP) .............................. JP2017-245907

(51) Int. Cl.
*B25J 13/08* (2006.01)
*B25J 19/02* (2006.01)
(Continued)

(52) U.S. Cl.
CPC ............. *B25J 13/08* (2013.01); *B25J 9/1697* (2013.01); *B25J 13/006* (2013.01); *B25J 19/00* (2013.01); *B25J 19/023* (2013.01)

(58) Field of Classification Search
CPC .... G06F 1/1626; G06F 1/1641; G06F 1/1637; G06F 1/1652; G06F 1/1618; G06F 1/1643; G06F 2203/04102; G06F 3/041; G09G 2380/02; G09G 3/3233; H01L 51/0097; H01L 51/5253; H01L 27/3244; H01L 27/323; H01L 51/524; H01L 2251/558; H01L 27/3276; H01L 2251/5338; B32B 7/12; B32B 2457/206; B32B 2457/208; Y02E 10/549
See application file for complete search history.

(56) References Cited

U.S. PATENT DOCUMENTS 7,689,319 B2 3/2010 Kanda et al.
9,489,579 B2 11/2016 Matsunaga
(Continued)

FOREIGN PATENT DOCUMENTS

CN 1835828 A 9/2006
CN 104639887 A 5/2015
(Continued)

OTHER PUBLICATIONS

JP-2002144260-A Translation (Year: 2002).*
(Continued)

*Primary Examiner* — Jeff A Burke
*Assistant Examiner* — Kyle T Johnson
(74) *Attorney, Agent, or Firm* — Holtz, Holtz & Volek PC

(57) ABSTRACT

A robot includes an operator and a processor. The operator is configured to cause a robot to operate. The processor acquires adornment information indicating an adornment that is applied to the robot, the adornment information being obtained based on a captured image of the robot. The processor controls the operator to perform an operation corresponding to the acquired adornment information.

16 Claims, 11 Drawing Sheets

(51) Int. Cl.
    *B25J 19/00*     (2006.01)
    *B25J 13/00*     (2006.01)
    *B25J 9/16*     (2006.01)

(56) References Cited

U.S. PATENT DOCUMENTS

| | | | |
|---|---|---|---|
| 9,618,937 B1* | 4/2017 | Blankespoor | B62D 57/032 |
| 10,124,487 B2 | 11/2018 | Liao | |
| 2007/0061040 A1* | 3/2007 | Augenbraun | A47L 5/225 |
| | | | 700/245 |
| 2008/0240889 A1* | 10/2008 | Yokoyama | B25J 9/1612 |
| | | | 414/1 |
| 2014/0095007 A1* | 4/2014 | Angle | B25J 19/0091 |
| | | | 701/23 |
| 2017/0266812 A1* | 9/2017 | Thapliya | B25J 11/0005 |
| 2017/0334065 A1* | 11/2017 | Liao | B25J 11/0005 |
| 2018/0088057 A1* | 3/2018 | Hashikami | G07C 5/0825 |
| 2018/0229372 A1* | 8/2018 | Breazeal | B25J 11/001 |
| 2019/0118104 A1* | 4/2019 | Su | A63H 3/02 |
| 2019/0160683 A1* | 5/2019 | Hayashi | A63H 3/28 |
| 2019/0193279 A1* | 6/2019 | Maeda | B25J 13/08 |
| 2020/0290198 A1* | 9/2020 | Yanase | A63F 13/825 |

FOREIGN PATENT DOCUMENTS

| | | | |
|---|---|---|---|
| CN | 106293102 A | | 1/2017 |
| JP | 2001191275 A | | 7/2001 |
| JP | 2002144260 A | * | 5/2002 |
| JP | 2003001582 A | | 1/2003 |
| JP | 2013139067 A | * | 7/2013 |
| JP | 2017205857 A | | 11/2017 |

OTHER PUBLICATIONS

JP-2013139067-A (Year: 2013).*
Japanese Office Action (and English language translation thereof) dated Apr. 28, 2020 issued in Japanese Application No. 2017-245907.
Extended European Search Report (EESR) dated Mar. 6, 2019 issued counterpart European Application No. 18211410.8.
Chinese Office Action (and English language translation thereof) dated Aug. 25, 2021, issued in Chinese Application No. 201811531141.0.

* cited by examiner

FIG. 6

| | ADORNMENT | ADORNMENT OPERATION CONTENT |
|---|---|---|
| 1 | TALL HAT | CHANGE TRAVEL ROUTE |
| 2 | HEAVY WINTER CLOTHING | SLOW MOVEMENT |
| 3 | SUNGLASSES | SUPPRESS POWER CONSUMPTION OF EYES, CHANGE TRAVEL ROUTE |
| 4 | EYEGLASSES | ADJUST EYEGLASSES |
| 5 | WRISTWATCH | LOOK AT WRISTWATCH |
| 6 | CAMERA | TAKE PHOTOGRAPH |
| 7 | SKIRT | DO BALLET DANCE |
| 8 | BATON | WAVE BATON WHEN MUSIC PLAYS |
| 9 | CALCULATOR | CALCULATE ACCORDING TO SPEECH INPUT |
| 10 | DICTIONARY | TRANSLATE |
| 11 | BRUSH | DRAW PICTURE |
| 12 | PRESENTATION MATERIALS | PROJECT MATERIALS |
| 13 | BRUSH + PAINTER HAT | DRAW PICTURE SKILLFULLY |
| 14 | PRESENTATION MATERIALS + LASER POINTER OR POINTING STICK | PROJECT MATERIALS AND DELIVER PRESENTATION |
| 15 | BRUSH (DOMINANT HAND) | DRAW PICTURE SKILLFULLY |
| 16 | RIBBON (HEAD) | BEHAVE LIKE GIRL |
| 17 | RIBBON (NECK) | BEHAVE LIKE BOY |

FIG. 14

| EMOTION | SOLO OPERATION CONTENT |
|---|---|
| LONELY (calm<0, excite<0) | MOVE TO A CORNER OF THE ROOM AS IF SEARCHING FOR SOMETHING AND STARE |
| | PACE AROUND THE ROOM MULTIPLE TIMES |
| | WALK SLOWLY |
| | STARE OFF IN DISTANCE WITH DISINTERESTED, SAD EXPRESSION |
| MOTIVATED (calm<0, excite≥0) | MOVE TO AN END OF THE ROOM AND WANDER AROUND AS IF WANTING TO GO OUTSIDE |
| | PLAY ALONE |
| | PLAY MAKE-BELIEVE |
| | PRETEND TO BE A DETECTIVE |
| | REHEARSE DANCE |
| HAPPY (calm≥0, excite≥0) | SING |
| | TAKE A RHYTHM |
| | SING AND DANCE |
| | RUN AROUND |
| | PRETEND TO BE A MONSTER |
| | WALK BACKWARD |
| | EXERCISE |
| RELAXED (calm≥0, excite<0) | STARE OUT THE WINDOW |
| | STRETCH |
| | SLEEP/YAWN |
| | ROCK BODY GENTLY |
| | STARE AT EMPTY SPACE AND SUDDENLY SHOUT | form an operation corresponding to the adornment information that is acquired by the adornment information acquirer.

ROBOT, ROBOT CONTROL SYSTEM, ROBOT CONTROL METHOD, AND NON-TRANSITORY STORAGE MEDIUM

CROSS-REFERENCE TO RELATED APPLICATION

This application is based upon and claims the benefit of priority from the prior Japanese Patent Application No. 2017-245907, filed Dec. 22, 2017, the entire contents of which are incorporated herein by reference.

FIELD

This application relates generally to a robot, a robot control system, a robot control method, and a non-transitory storage medium.

BACKGROUND

Robots are known that communicate with humans. For example, Unexamined Japanese Patent Application Kokai Publication No. 2003-1582 describes a technique for removably dressing a walking robot with a costume. Applying an adornment such as a costume to a robot can create a sense of closeness to the robot and can enhance the entertainment based on appearance of the robot.

SUMMARY

A robot according to an aspect of the present disclosure includes:
an operator configured to cause the robot to operate; and
a processor; wherein
the processor
acquires adornment information indicating an adornment that is applied to the robot, the adornment information being obtained based on a captured image of the robot, and
controls the operator to perform an operation corresponding to the acquired adornment information.
A robot control system according to an aspect of the present disclosure includes:
the robot described above; and
a charging station that charges the robot.
A robot control method according to an aspect of the present disclosure includes:
acquiring adornment information indicating an adornment that is applied to a robot, the adornment information being obtained based on a captured image of the robot; and
controlling the robot to perform an operation corresponding to the acquired adornment information.
A non-transitory storage medium according to an aspect of the present disclosure comprises a program that causes a computer of a robot to function as:
an operator that causes the robot to operate;
an adornment information acquirer that acquires adornment information indicating an adornment that is applied to the robot, the adornment information being obtained based on a captured image of the robot; and
an operation controller that controls the operator to perform an operation corresponding to the adornment information that is acquired by the adornment information acquirer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 6 is a table illustrating an example of adornment operations performed by the robot according to Embodiment 1;

FIG. 14 is a table illustrating an example of solo operations performed by the robot according to Embodiment 3.

DETAILED DESCRIPTION

Figure 1:
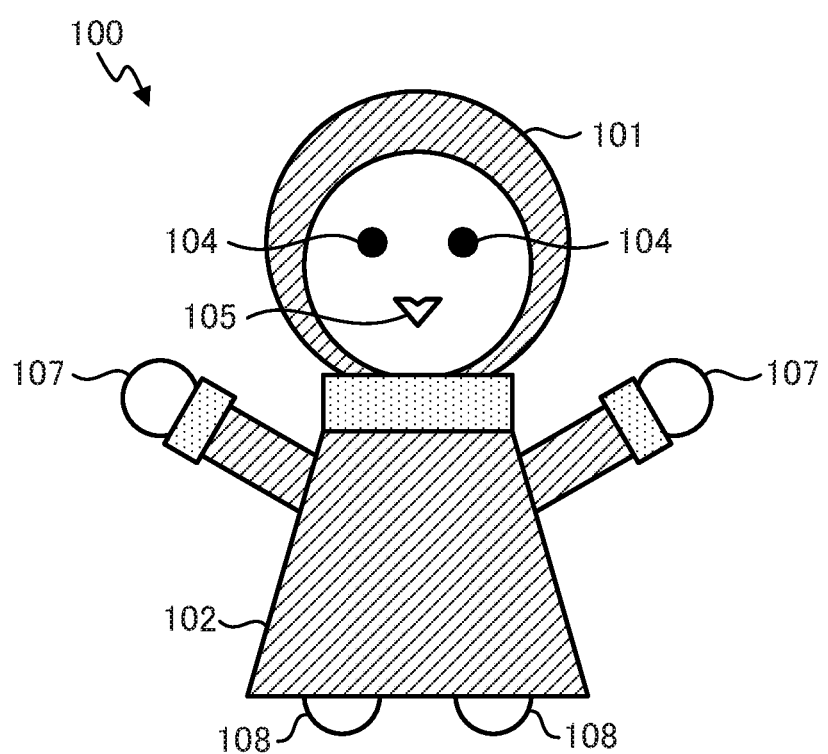
FIG. 1 is a drawing illustrating the appearance of a robot according to Embodiment 1 of the present disclosure.

Hereinafter, embodiments of the present disclosure are described while referencing the drawings. Note that, in the drawings, identical or corresponding components are marked with the same reference numerals.

Embodiment 1

FIG. 1 illustrates the appearance of a robot 100 according to Embodiment 1 of the present disclosure. The robot 100 has a shape resembling that of a human (child), and is a device that operates autonomously according to a predefined operation program.

The robot 100 performs various operations in response to external stimulation, such as calls from and contact by a certain target that exists outside the robot 100. Thus, the robot 100 can communicate with the certain target and interact with the certain target. The certain target is an entity that exists outside the robot 100 and that communicates and interacts with the robot 100. Examples of the certain target include a user that is the owner of the robot 100, a human near the user (family, friend, or the like of the user), and an animal near the user (pet or the like owned by the user or the like). The certain target can also be referred to as a communication target, a communication partner, an interaction target, an interaction partner, or the like.

As illustrated in FIG. 1, the robot 100 has a three-dimensional shape with an appearance resembling a human (child). The robot 100 is fabricated using a hard synthetic resin such as plastic, for example, as the main material. The robot 100 includes a head 101, a body 102, eyes 104, a mouth 105, hand portions 107, and feet 108.

The head 101, the hands 107, and the feet 108 are parts that can be moved by drive members installed in the robot 100. The head 101 is attached to the body 102 by a neck joint so as to be rotatable in the three directions of pitch, roll, and yaw. The neck joint is provided on the neck. The eyes 104 are provided with a display 117 that displays an image related to the eyes (eyeballs or the like). The mouth 105 is provided with an imager 115a that images the space in front of the robot 100.

Figure 2:
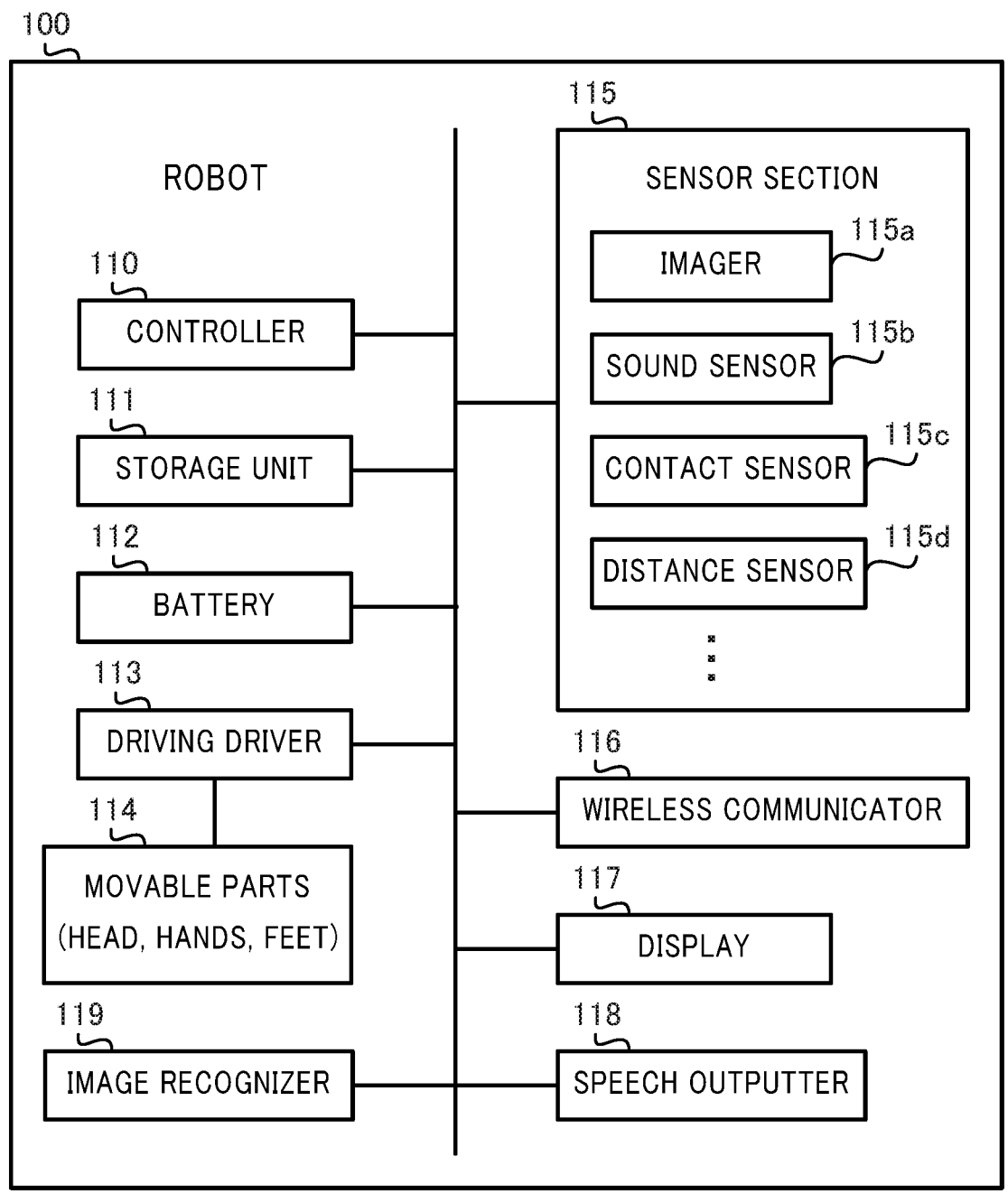
FIG. 2 is a block diagram illustrating the hardware configuration of the robot according to Embodiment 1.

FIG. 2 illustrates the hardware configuration of the robot 100. As illustrated in FIG. 2, the robot 100 includes a controller (central processing unit) 110, a storage unit 111, a battery 112, a driving driver 113, movable parts 114, a sensor section 115, a wireless communicator 116, a display 117, a speech outputter 118, and an image recognizer 119.

The controller 110 includes a central processing unit (CPU), read only memory (ROM), and random access memory (RAM). In one example, the CPU is a microprocessor or the like and is a central processing unit that executes a variety of processing and computation. In the controller 110, the CPU reads out a control program stored in the ROM and controls the operation of the entire robot 100 while using the RAM as working memory.

The storage unit 111 is nonvolatile memory such as flash memory or a hard disk. The storage unit 111 stores an operating system (OS), application programs, and other programs and data used by the controller 110 to perform the various processes. Moreover, the storage unit 111 stores data generated or acquired as a result of the controller 110 performing the various processes.

The battery 112 is a storage battery that stores electrical energy and supplies power to the various components of the robot 100. When the robot 100 has returned to the charging station, the battery 112 is charged by the charging station.

The driving driver 113 includes the drive members such as a motors and actuators that drive the movable parts 114 of the robot 100, and drive circuits that drive these drive members. The movable parts 114 are parts that can move, specifically the head 101, the hands 107, and the feet 108. The controller 110 sends control signals to the drive circuits on the basis of the operation program. The drive circuits provide driving pulse signals to the drive members in accordance with the control signals sent from the controller 110. The drive members drive the movable parts 114 in accordance with the pulse signals provided from the drive circuits.

The driving driver 113 drives the movable parts 114, thereby causing the robot 100 to perform various operations. For example, by moving the feet 108, the robot 100 can be moved forward or backward, or the direction of the robot 100 can be changed. Additionally, by moving the head 101 or the hands 107, the robot 100 can imitate human operations and human gestures.

The sensor section 115 includes a plurality of sensors that detect physical quantities around or inside the robot 100. As illustrated in FIG. 2, the sensor section 115 includes an imager 115a that captures an image of the surroundings of the robot 100, a sound sensor 115b that detects sound, a contact sensor 115c that detects contact with the robot 100, and a distance sensor 115d that measures distances to surrounding objects. In addition, while not illustrated in the drawings, the sensor section 115 includes an acceleration sensor that detects movement of the robot 100, a gyro sensor that detects rotation of the robot 100, a geomagnetic sensor that detects the orientation of the robot 100, a temperature sensor that detects the temperature of the surroundings of the robot 100, an atmospheric pressure sensor that detects the atmospheric pressure of the surroundings of the robot 100, and the like.

The imager 115a is a so-called camera, and is installed in the mouth 105. The imager 115a includes an image acquirer that acquires an image of a target by collecting light reflected from the target and an image processor that processes the image acquired by the image acquirer. The imager 115a functions as an imager (robot-side imager) that captures an image of the space in front of the robot 100. The sound sensor 115b is installed in the head 101 and detects speech uttered by the certain target, ambient environmental sounds, and the like. While not illustrated in the drawings, the robot 100 includes, as the sound sensor 115b, a plurality of microphones arranged surrounding the head 101. This configuration enables the efficient detection of sounds generated from all directions. Other sensors are installed at various locations of the robot 100. The robot 100 acquires information indicating the surrounding state and the internal state of the robot 100 via these sensors. The sensor section 115 acquires information indicating the surrounding state and the internal state of the robot 100 via this plurality of sensors and supplies this information to the controller 110.

The wireless communicator 116 includes an interface for wirelessly communicating with external devices. Under the control of the controller 110, the wireless communicator 116 wirelessly communicates with external devices, including the charging station, in accordance with a communication standard such as Wireless Fidelity (Wi-Fi) or a similar wireless local area network (LAN), Bluetooth (registered trademark), or Near Field Communication (NFC).

The display 117 is a display device such as a liquid crystal display, an organic electro luminescence (EL) display, or a light emitting diode (LED). The display 117 is installed in the eyeball portions of the eyes 104 and, under the control by a display drive circuit (not illustrated in the drawings), displays various images according to the situation.

The speech outputter 118 includes a speaker and a speech output interface. The speech outputter 118 converts speech data generated by the controller 110 to speech, and outputs this speech out of the robot 100. The speaker is installed in the head 101. The speech outputter 118 outputs various types of speech including animal sounds and human language. For example, the robot 100 collects the speech of the certain target via the sound sensor 115b, and outputs, from the speech outputter 118, speech corresponding to the utterance content of the certain target. As a result, the robot 100 is capable of simple conversation with the certain target.

The image recognizer 119 includes a processor for image processing such as a digital signal processor (DSP) or a graphics processing unit (GPU), and buffer memory that temporarily saves images to be processed. The image recognizer 119 recognizes the images captured by the imager 115a. The image recognizer 119 uses well-known image recognition techniques to recognize people, faces, objects, patterns, and the like included in the images captured by the imager 115a. The image recognizer 119 recognizes the face of the certain target captured by the imager 115a.

Figure 3:
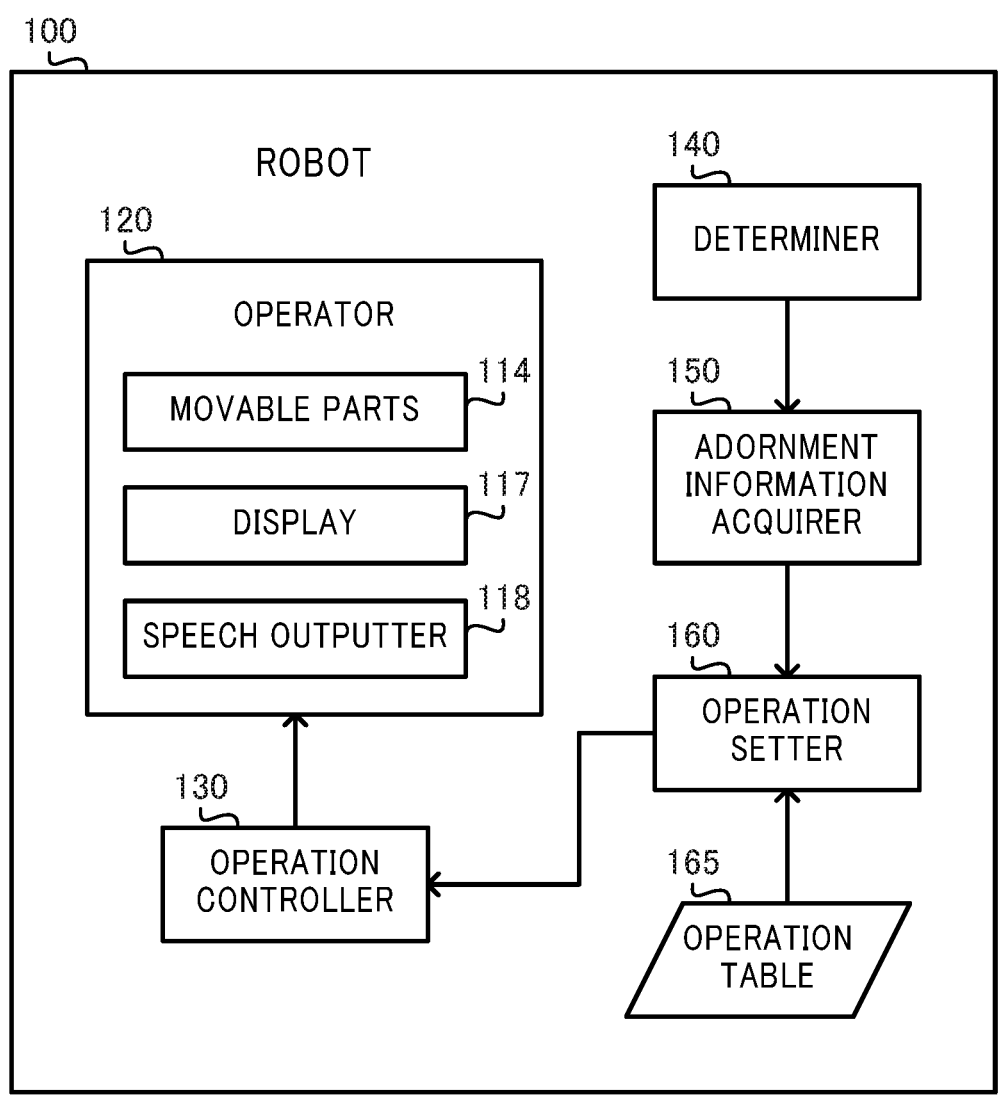
FIG. 3 is a block diagram illustrating the functional configuration of the robot according to Embodiment 1.

Next, the functional configuration of the robot 100 is described while referencing FIG. 3. As illustrated in FIG. 3, the robot 100 functionally includes an operator 120, an operation controller 130, a determiner 140, an adornment information acquirer 150, and an operation setter 160. In the controller 110, the CPU performs control to read the program stored in the ROM out to the RAM and execute that program. Thus, the CPU functions as the various components, namely the operation controller 130, the determiner 140, the adornment information acquirer 150, and the operation setter 160.

The operator 120 is a component that causes the robot 100 to perform operations. Specifically, the operator 120 includes the movable parts 114, the display 117, and the speech outputter 118, and causes the robot 100 to perform operations by moving the movable parts 114, displaying an image on the display 117, or outputting speech from the speech outputter 118.

The operation controller 130 controls the operator 120 to cause the robot 100 to perform various predefined operations. For example, the operation controller 130 changes the position, direction, posture, or the like of the robot 100 by moving the movable parts 114 including the feet 108. In another example, the operation controller 130 changes the facial expression of the robot 100 by displaying an image on the display 117. In yet another example, the operation controller 130 causes the robot 100 to converse with the certain target by outputting speech from the speech outputter 118. The operation controller 130 is realized by cooperation between the controller 110, the driving driver 113, the movable parts 114, the display 117, and the speech outputter 118.

The determiner 140 determines whether an adornment is applied to the robot. Here, the term "adornment" refers to a costume, an accessory, eyeglasses, a watch, or the like, and is an article (part) that is attached as an add-on to the exterior of the robot 100. The determiner 140 determines whether the user, for example, has attached such an adornment to the robot 100.

Figure 4:
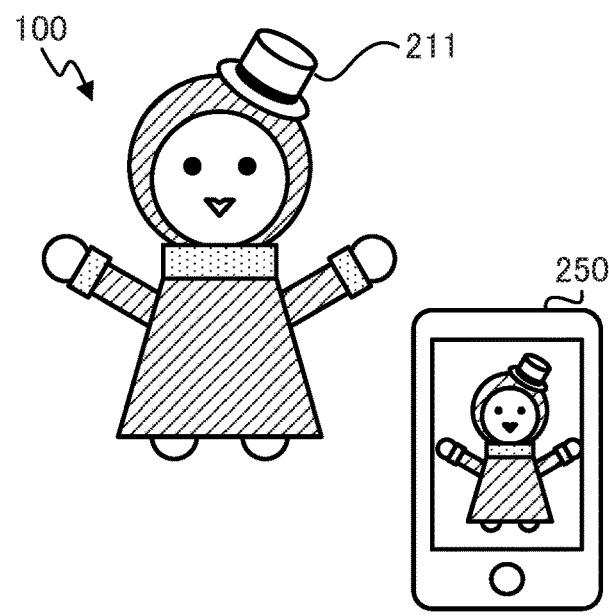
FIG. 4 is a drawing illustrating a situation in which an image of the robot according to Embodiment 1 is captured.
Figure 5:
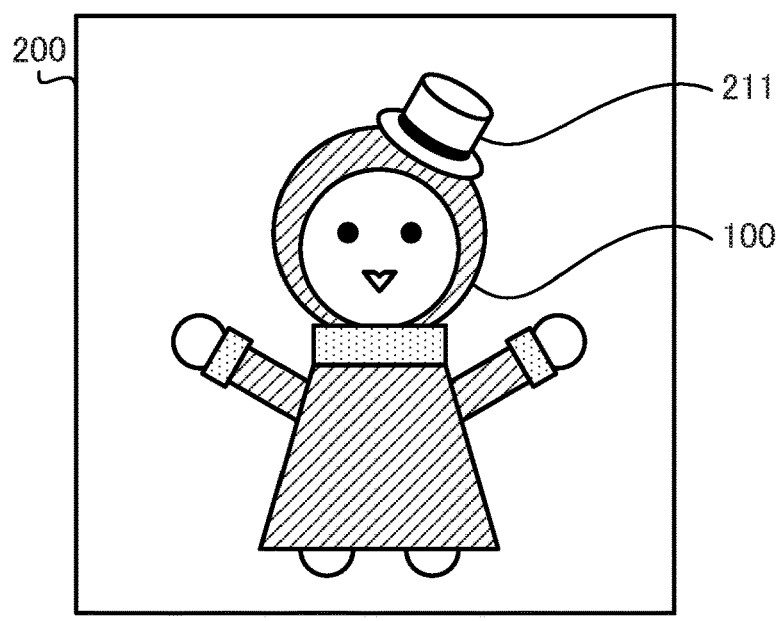
FIG. 5 is a drawing illustrating an example of a captured image of the robot according to Embodiment 1.

Specifically, the determiner 140 determines, on the basis of a captured image in which the robot 100 is captured, whether an adornment is applied to the robot. FIG. 4 illustrates a situation in which an image of the robot 100, wearing a hat 211 as an adornment, is captured. FIG. 5 illustrates a captured image 200 of the robot 100 obtained as a result of the image capturing.

As illustrated in FIG. 4, when the user applies some sort of adornment to the robot 100, the user captures an image of the appearance of the robot 100 using a communication terminal 250. Thus, the user acquires a captured image 200 such as that illustrated in FIG. 5, for example. The communication terminal 250 is a device that is provided with an imager (communication terminal-side imager), such as a smartphone, a mobile phone, a digital camera, or the like. When the user captures an image of the robot 100 using the communication terminal 250, the captured image 200 obtained by the image capturing is sent from the communication terminal 250 to the robot 100. The determiner 140 acquires, via the wireless communicator 116, the captured image 200 sent from the communication terminal 250. The captured image 200 may be sent directly from the communication terminal 250 to the robot 100, or may be sent indirectly to the robot 100 via another device such as the charging station, a server, or the like.

When the determiner 140 acquires the captured image 200 of the robot 100, the determiner 140 determines whether an adornment is applied to the robot 100 by comparing the acquired captured image 200 with a reference image. The reference image is an image that serves as a reference of the default appearance of the robot 100, and depicts an appearance of the robot 100 in a state that is free of any adornments. The determiner 140 recognizes, via the functions of the image recognizer 119, the robot 100 captured in the captured image 200. Then, when there is a difference between the appearance of the recognized robot 100 and the appearance of the robot 100 depicted in the reference image, the determiner 140 determines that an adornment is applied to the robot 100. The determiner 140 is realized by cooperation between the controller 110, the communication unit 116, and the image recognizer 119.

When an adornment is applied to the robot 100, the adornment information acquirer 150 acquires adornment information indicating that adornment. The adornment information is information that identifies the adornment that is applied to the robot 100. The adornment information acquirer 150 acquires the adornment information on the basis of the captured image 200 in which the robot 100 is captured.

Specifically, when the determiner 140 determines that an adornment is applied to the robot 100, the adornment information acquirer 150 acquires the difference between the robot 100 captured in the captured image 200 and the robot 100 depicted in the reference image. Then, the determiner 140 identifies, by an object recognition technique, an object corresponding to the acquired difference.

When, for example, the hat 211 is placed on the robot 100 as illustrated in FIG. 5, the adornment information acquirer 150 acquires adornment information indicating that the adornment applied to the robot 100 is the hat 211. Alternatively, when a costume is placed on the robot 100, the adornment information acquirer 150 acquires adornment information indicating that the adornment applied to the robot 100 is a costume. The adornment information acquirer 150 is realized by cooperation between the controller 110 and the image recognizer 119.

The operation setter 160 sets, according to the adornment information acquired by the adornment information acquirer 150, an operation to be performed by the operator 120. Specifically, the operation setter 160 references a predefined operation table 165. The operation table 165 is a table that defines operations (hereinafter referred to as "adornment operations") corresponding to adornments applied to the robot 100. The operation table 165 is stored in advance in the storage unit 111.

FIG. 6 illustrates a specific example of the operation table 165. As illustrated in FIG. 6, each adornment applied to the robot 100 is associated with the content of an adornment operation that the robot 100, to which that adornment is applied, is caused to perform. For example, (1) when a tall hat is applied as the adornment, the operation setter 160 changes the travel route of the robot 100 to a route with looser height restrictions so that the hat does not strike any obstacles when the robot 100 moves. (2) When heavy winter clothing is applied as the adornment, the operation setter 160 narrows the range of motion of the head 101, the hands 107, and the feet 108, thereby slowing down the movement of the robot 100. (3) When sunglasses are applied as the adornment, the operation setter 160 lowers the brightness of the display 117, thereby suppressing the power consumption of the eyes 104. Additionally, when the sunglasses are not applied, the operation setter 160 changes the travel route of the robot 100 so as to avoid sunny routes more than when the sunglasses are applied. (4) When eyeglasses are applied as the adornment, the operation setter 160 sets a gesture of adjusting the eyeglasses using the hands 107. (5) When a wristwatch is applied as the adornment, the operation setter 160 sets a gesture of looking at the wristwatch. In addition, when a camera, a skirt, or the like is applied as the adornment such as in (6) to (12) illustrated in FIG. 6, the operation setter 160 sets the adornment operation such that a function or a skill using that adornment is demonstrated.

When a plurality of adornments is applied to the robot 100, the operation setter 160 sets the operation according to the plurality of adornments. For example, (13) When a brush and a painter hat are applied, the operation setter 160 sets the operation of the robot 100 such that the robot 100 draws more skillfully than when only the brush is applied. (14) When presentation notes and a laser pointer or a pointing stick are applied, the operation setter 160 sets the operation of the robot 100 so as to deliver a presentation using the laser pointer or the pointing stick.

When an adornment is applied to the robot 100, the operation setter 160 may set the operation according to the location where the adornment is performed. For example, (15) when a brush is applied to the dominant hand as the adornment, the operation setter 160 sets the operation of the robot 100 such that the robot 100 draws more skillfully than when the brush is applied to the non-dominant hand. (16) When a ribbon is applied to the head as the adornment, the operation setter 160 recognizes the ribbon as a hair ornament and sets the operation of the robot 100 such that the robot 100 behaves like a girl. (17) When a ribbon is applied to the neck as the adornment, the operation setter 160 recognizes the ribbon as a necktie and sets the operation of the robot 100 such that the robot 100 behaves like a boy.

Thus, the operation setter 160 sets various operations according to the adornment applied to the robot 100. The operation setter 160 is realized by cooperation between the controller 110 and the storage unit 111.

When the operation setter 160 sets the operation, the operation controller 130 controls the operator 120 to cause the robot 100 to perform the set operation. In other words, when an adornment is applied to the robot 100, the operation controller 130 controls the operator 120 to perform the adornment operation corresponding to that adornment.

Figure 7:
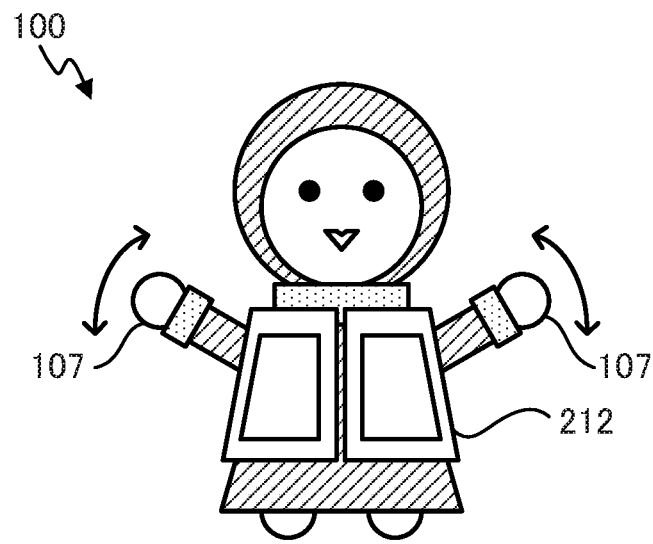
FIG. 7 is a first drawing illustrating a situation in which the robot according to Embodiment 1 is performing an adornment operation.
Figure 8:
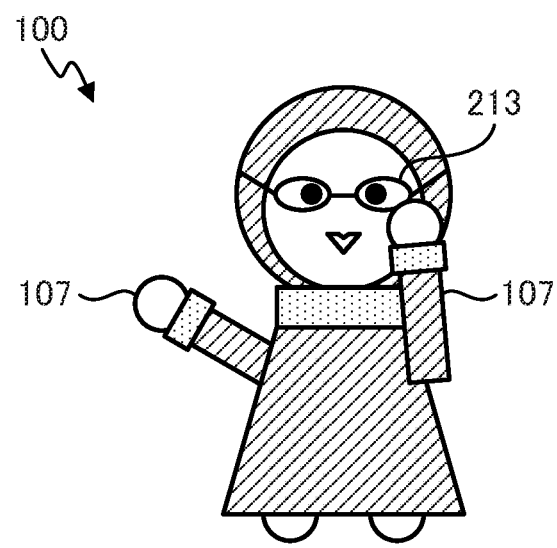
FIG. 8 is a second drawing illustrating a situation in which the robot according to Embodiment 1 is performing an adornment operation.

For example, when heavy winter clothing, namely the costume 212, is applied as the adornment, the operation controller 130 narrows the range of motion of the hands 107, as illustrated in FIG. 7. Specifically, the operation controller 130 controls the operation of the hands 107 such that the motion of the hands 107 in the directions indicated by the arrows in FIG. 7 is smaller than when the costume 212 is not applied. Alternatively, when eyeglasses 213 are applied as the adornment, the operation controller 130 causes a hand 107 to move to the head 101 as illustrated in FIG. 8 to perform a gesture of adjusting the eyeglasses 213.

Thus, the operation controller 130 causes the robot 100 to perform the various operations defined in FIG. 6 by driving the head 101, the hands 107, and the feet 108, displaying an image on the display 117, or outputting speech from the speech outputter 118. Since the robot 100 performs a variety of operations according to the adornments, the user can be entertained.

Figure 9:
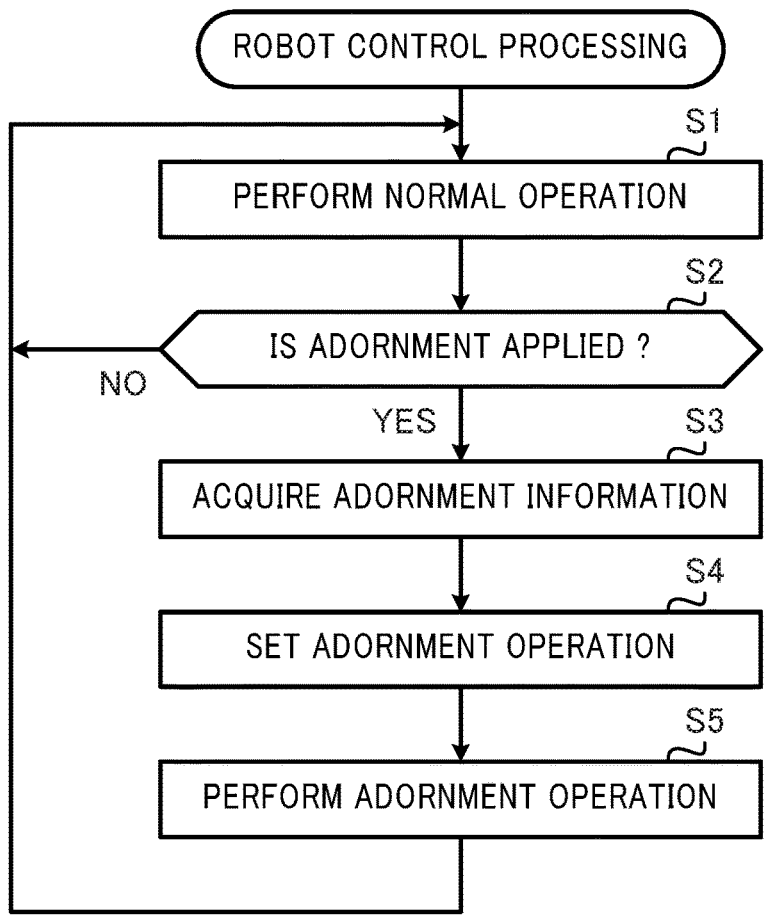
FIG. 9 is a flowchart illustrating the flow of robot control processing executed by the robot according to Embodiment 1.

Next, the flow of the processing executed in the robot 100 configured as described above is described while referencing the flowchart illustrated in FIG. 9.

The robot control processing illustrated in FIG. 9 is started when the robot 100 is placed in a normal operable state. The normal operable state is defined by the power supply of the robot 100 being turned ON and the battery 112 being charged.

When the robot control processing starts, the controller 110 functions as the operation controller 130 and causes the operator 120 to execute a normal operation (step S1). Here, the phrase "normal operation" refers to an operation under normal conditions that is unrelated to whether an adornment is applied to the robot 100. For example, the controller 110 changes the position, direction, posture, or the like of the robot 100 by moving the movable parts 114. Alternatively, the controller 110 displays an image on the display 117 and outputs speech from the speech outputter 118. Thus, the controller 110 causes the robot 100 to perform behavior typical of a robot by causing the operator 120 to execute various predefined operations.

During the period in which the controller 110 is causing the operator 120 to execute the normal operation, the controller 110 functions as the determiner 140 and determines whether an adornment is applied to the robot 100 (step S2). Specifically, the controller 110 acquires the captured image 200 obtained as a result of the user imaging the robot 100, and determines whether an adornment is applied to the robot 100 by comparing the acquired captured image 200 with the reference image.

When the controller 110 determines that an adornment is not applied to the robot 100 (step S2; NO), the controller 110 remains at step S1 and continues to cause the operator 120 to execute the normal operation.

When the controller 110 determines that an adornment is applied to the robot 100 (step S2; YES), the controller 110 functions as the adornment information acquirer 150 and acquires the adornment information indicating the adornment applied to the robot 100 (step S3). Specifically, the controller 110 performs object recognition on the difference between the captured image 200 of the robot 100 and the reference image. As a result, the controller 110 identifies if the adornment applied to the robot 100 is, for example, the hat 211, the costume 212, the eyeglasses 213, or the like.

When the controller 110 acquires the adornment information, the controller 110 functions as the operation setter 160 and sets the adornment operation corresponding to the adornment applied to the robot 100 (step S4). Specifically, the controller 110 references the operation table illustrated in FIG. 6, identifies the operation corresponding to the adornment applied to the robot 100, and sets the identified operation as the operation to be performed by the robot 100.

When the controller 110 sets the adornment operation, the controller 110 functions as the operation controller 130 and causes the robot 100 to perform the set operation (step S5). Specifically, the controller 110 controls the movable parts 114, the display 117, or the speech outputter 118 and causes the robot 100 to perform the operation corresponding to the adornment, such as illustrated in FIG. 7 or FIG. 8.

When the robot 100 is caused to perform the adornment operation, the controller 110 returns to the processing of step S1 and repeats the processing of steps S1 to S5. In other words, each time an adornment is applied to the robot 100 while the robot 100 is performing the normal operation, the controller 110 repeats the processing that causes the robot 100 to perform the operation corresponding to that adornment.

As described above, the robot 100 according to Embodiment 1 determines whether an adornment is applied to the robot 100 and, when it is determined that an adornment is applied to the robot 100, performs an operation corresponding to that adornment. Thus, with the robot 100 that the user can adorn as desired, the robot 100 performs various operations in response to the adornments applied to the robot 100. As a result, the entertainment of the robot 100 can be enhanced.

Note that, in Embodiment 1, the determiner 140 determines, on the basis of the captured image 200 that is captured by the user, whether an adornment is applied to the robot 100. However, in the present disclosure, the determiner 140 may use the contact sensor 115c or a switch to determine whether an adornment is applied to the robot 100. For example, a configuration is possible in which the contact sensor 115c or the switch is disposed at a plurality of locations where adornments may be applied to the robot 100, and attachable locations are predetermined on the basis of the type of adornment. In this case, for example, if the adornment is the hat 211, the adornment is applied to the head 101; if the adornment is the costume 212, the adornment is applied to the body 102; and if the adornment is the eyeglasses 213, the adornment is applied to the eyes 104. Additionally, in this case, when contact by the contact sensor 115c is detected at one of the locations or pressing by the switch is detected at one of the locations, the determiner 140 determines that an adornment is applied. Then, depending on the location of the contact sensor 115c or the switch where the adornment is detected, the adornment information acquirer 150 acquires the adornment information indicating if the adornment is, for example, the hat 211, the contact sensor 115c, or the eyeglasses 213.

Additionally, a configuration is possible in which an integrated circuit (IC) tag is embedded in the adornment in advance, and the determiner 140 determines whether the adornment is applied to the robot 100 by wireless communication such as NFC using the IC tag. Specifically, when an adornment is applied to the robot 100, the determiner 140 receives, via the function of the wireless communicator 116, a wireless signal emitted from the IC tag embedded in that adornment. When the determiner 140 receives the wireless signal from the IC tag, the determiner 140 determines that the adornment is applied to the robot 100. Additionally, identification information for identifying the adornment is included in the wireless signal emitted from the IC tag. The adornment information acquirer 150 acquires, on the basis of this identification information, the adornment information indicating if the adornment applied to the robot 100 is, for example, the hat 211, the contact sensor 115c, or the eyeglasses 213.

Embodiment 2

Next, Embodiment 2 of the present disclosure will be described. In Embodiment 2, as appropriate, descriptions of configurations and functions that are the same as described in Embodiment 1 are forgone.

The robot 100 according to Embodiment 1 determines whether an adornment is applied to the robot 100 and acquires the adornment information on the basis of the captured image 200 captured by the user. In contrast, the robot 100 according to Embodiment 2 acquires the captured image 200 by using a mirror provided on the charging station to image the appearance of the robot 100. The robot 100 according to Embodiment 2 is described below.

Figure 10:
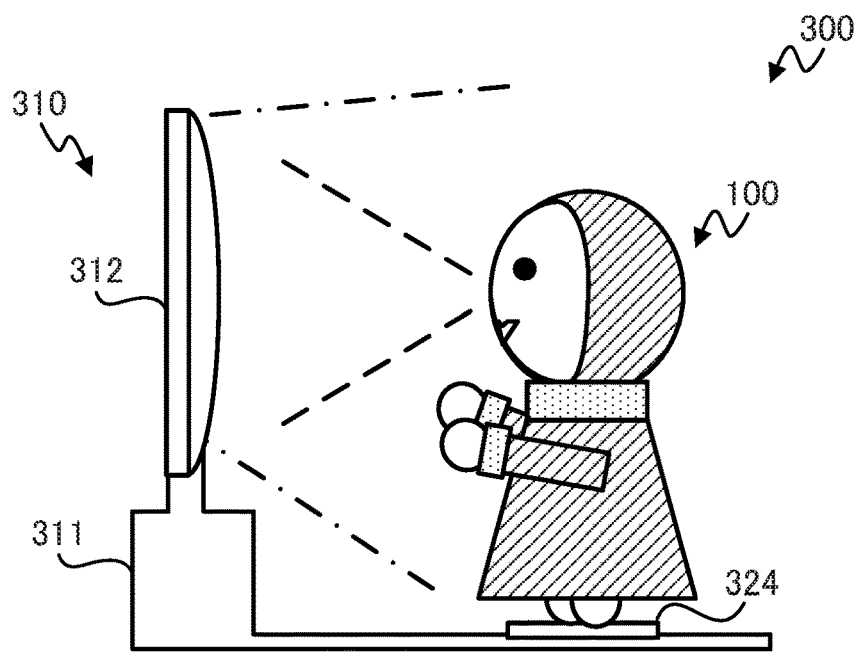
FIG. 10 is a drawing illustrating a robot control system according to Embodiment 2 of the present disclosure.

FIG. 10 illustrates a robot control system 300 according to Embodiment 2. The robot control system 300 includes the robot 100 and a charging station 310. The robot 100 has the same configuration as described in Embodiment 1.

The charging station 310 is equipment for charging the robot 100. The charging station 310 is installed at an appropriate location such that the robot 100 can autonomously move (return) to the charging station 310. Examples of the appropriate location include a location in the same room as the robot 100.

Figure 11:
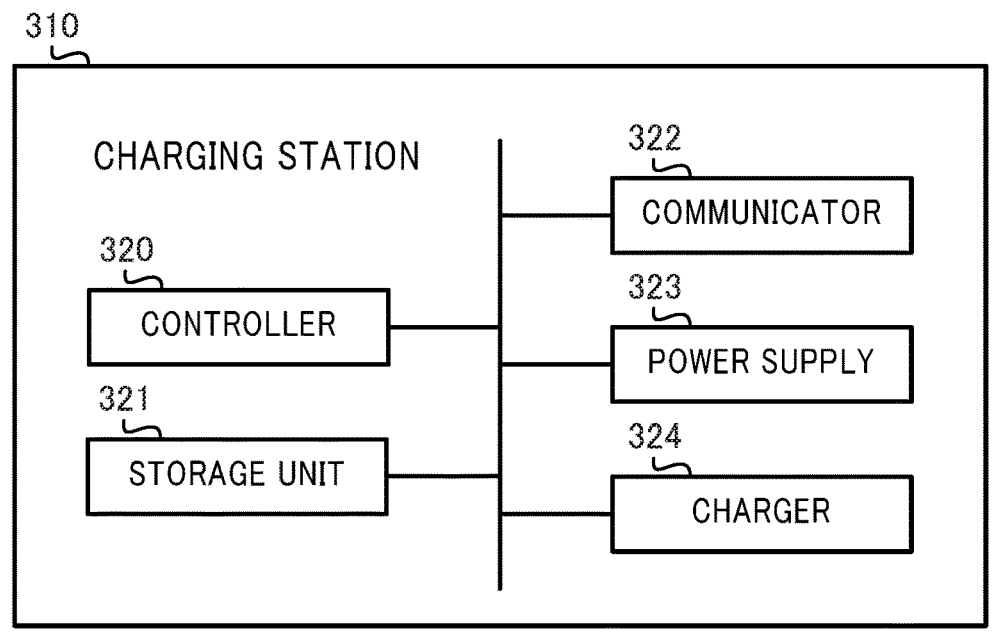
FIG. 11 is a block diagram illustrating the configuration of the control of a charging station according to Embodiment 2.

As illustrated in FIG. 10, the charging station 310 includes a mirror 312 on an upper portion and a stand 311 on a lower portion. The stand 311 includes a columnar support that supports the mirror 312 and a plate-like bottom on which the robot 100 is placed. As illustrated in FIG. 11, the charging station 310 includes, as components related to control, a controller 320, a storage unit 321, a communicator 322, a power supply 323, and a charger 324.

The controller 320 includes a CPU, ROM, and RAM. In one example, the CPU is a microprocessor or the like and is a central processing unit that executes a variety of processing and computation. In the controller 320, the CPU reads out a control program stored in the ROM and controls the operation of the entire charging station 310 while using the RAM as working memory.

The storage unit 321 is nonvolatile memory such as flash memory or a hard disk. The storage unit 321 stores programs and data used by the controller 320 to perform various processes. Moreover, the storage unit 321 stores data generated or acquired as a result of the controller 320 performing the various processes.

The communicator 322 includes an interface for performing wired or wireless communication with external devices. Under the control of the controller 320, the communicator 322 wirelessly communicates with the robot 100 in accordance with a communication standard such as Wi-Fi or a similar wireless LAN, or Bluetooth (registered trademark).

The power supply 323 includes a power supply circuit, and produces and supplies the necessary power to the various components of the charging station 310. The charger 324 includes a charging circuit and charges the battery 112 of the robot 100.

As illustrated in FIG. 10, the charger 324 is provided at the bottom of the stand 311. When the robot 100 has returned to the charging station 310, the robot 100 stays on top of the charger 324. Electrodes that receive charging from the charger 324 are provided on the bottom surfaces of the feet 108 of the robot 100. The charger 324 supplies power generated by the power supply 323 to the robot 100 via the electrodes on the feet 108, thereby charging the battery 112 of the robot 100 that has returned to the charging station 310.

The mirror 312 includes a mirror surface that reflects visible light. The mirror surface is provided at a position facing the robot 100 that has returned to the charging station 310.

The front of the robot 100 faces the mirror 312 while the robot 100 is being charged by the charger 324. In this state, the mirror surface of the mirror 312 is within the imaging range (the area defined by the dashed lines in FIG. 10) of the imager 115a of the robot 100.

When viewed from the imager 115a while the robot 100 is being charged by the charger 324, the area defined by the dash-dot lines in FIG. 10 appears in the mirror surface of the mirror 312 as a mirror image. Thus, the shape, dimensions, and installation location of the mirror surface of the mirror 312 are determined such that the entire robot 100 is included, as a mirror image, within the imaging range of the imager 115a of the robot 100 during charging.

The location of the charging station 310 is stored in advance in the storage unit 111. When a predetermined charging condition is satisfied, the robot 100 drives the movable parts 114 and moves the robot 100 to the location of the charging station 310 in order to charge the battery 112. The predetermined charging condition is a predetermined condition for charging the robot 100. Specifically, the predetermined charging condition is satisfied when an amount of charge of the battery 112 is below a specified value, or when a predefined periodic timing arrives. Charging by the charger 324 starts when the charging condition is satisfied and the robot 100 is positioned at the charging station 310. When the charging starts, the imager 115a captures, via the mirror 312, the appearance of the robot 100 being charged, thereby acquiring the captured image 200.

The determiner 140 determines, on the basis of the captured image 200 of the robot 100 that is obtained by the imager 115a, whether an adornment is applied to the robot 100. Specifically, upon the acquisition of the captured image 200 of the robot 100 by the imager 115a, the determiner 140 determines whether an adornment is applied to the robot 100 by comparing the captured image 200 with the reference image, as in Embodiment 1.

When the determiner 140 determines that an adornment is applied to the robot 100, the adornment information acquirer 150 acquires the adornment information indicating that adornment. Specifically, the adornment information acquirer 150 uses the image recognizer 119 to identify the difference between the captured image 200 and the reference image, thereby discerning whether the adornment applied to the robot 100 is, for example, the hat 211, the costume 212, or the eyeglasses 213. The operation setter 160 sets, according to the adornment information acquired by the adornment information acquirer 150, an operation to be performed by the operator 120. The operation controller 130 controls the operator 120 to perform the operation set by the operation setter 160. The functions of these components are the same as described in Embodiment 1.

As described above, the robot 100 according to Embodiment 2 determines and identifies the adornment applied to the robot 100 by imaging the appearance of the robot 100 using the mirror 312 of the charging station 310 while the robot 100 is being charged by the charging station 310. Since the robot 100 according to Embodiment 2 captures an image of the appearance of the robot 100 using the mirror 312, the need for imaging the robot 100 by an external device such as the communication terminal 250 in Embodiment 1 is eliminated. As such, with the robot 100 that performs various operations corresponding to adornments, less effort is needed to determine and identify the adornment that is applied to the robot 100.

Note that, in Embodiment 2, the charging station 310 includes the mirror 312. However, in the present disclosure, the mirror 312 may be provided at a location other than the charging station 310. For example, a typical mirror used as furniture may be used as the mirror 312 for imaging the appearance of the robot 100. In this case, the location of the mirror 312 is stored in advance in the storage unit 111, and the operation controller 130 controls the operator 120 to move the robot 100 to the location where the mirror is provided at a predetermined periodic timing, for example. Then, when the operation controller 130 has controlled the operator 120 to move the robot 100 in front of the mirror 312, the imager 115a captures an image of the robot 100 via the mirror 312, thereby acquiring the captured image 200.

A configuration is possible in which the robot 100 captures an image of the appearance of the robot 100 by the imager 115a of the robot 100, without using the mirror 312. For example, in a case in which the imager 115a is provided at the tip of one of the hands 107, the robot 100 can capture an image of the appearance of the robot 100 by extending that hand 107 and directing the imaging range of the imager 115a toward the robot 100. Thus, in some configurations of the robot 100, the captured image 200 in which the robot 100 is captured can be acquired without using the mirror 312.

Figure 12:
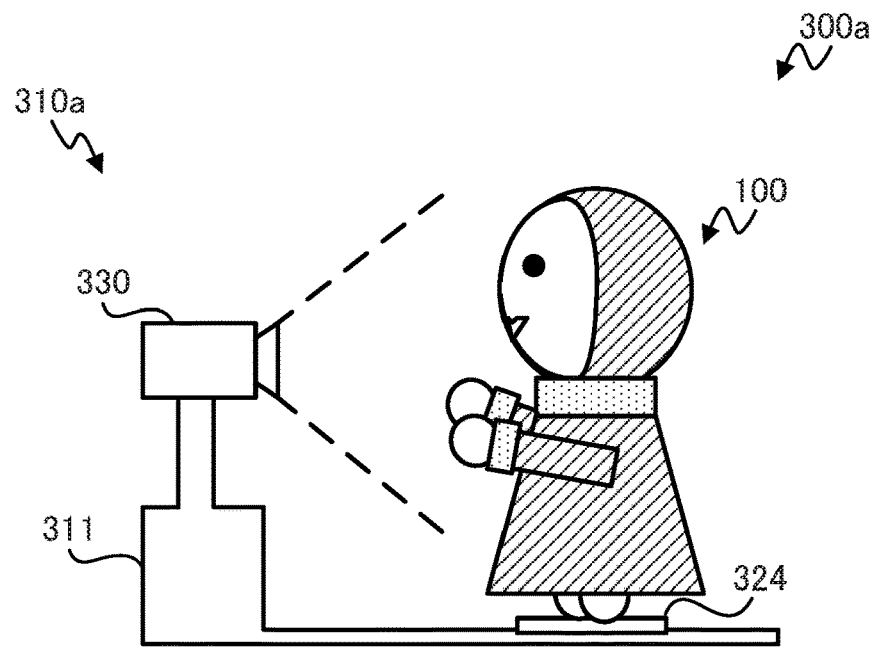
FIG. 12 is a drawing illustrating a robot control system according to a modified example of Embodiment 2.

A configuration is possible in which, as shown in FIG. 12, for example, a charging station 310a includes an imager 330 that captures an image of the robot 100. In a robot control system 300a illustrated in FIG. 12, the charging station 310a includes the imager 330 at the location where the mirror 312 is provided in FIG. 10. The imager 330 functions as a station-side imager and captures the area defined by the dashed lines in FIG. 12 as the imaging range. Thus, the imager 330 acquires the captured image 200 in which the appearance of the robot 100 being charged by the charger 324 is depicted. The controller 320 cooperates with the communicator 322 to function as a transmitter, and sends the captured image 200 captured by the imager 330 to the robot 100.

In the robot 100, the controller 110 cooperates with the wireless communicator 116 to function as a receiver, and receives the captured image 200 sent from the charging station 310a. Then, the determiner 140 determines, on the basis of the received captured image 200, whether an adornment is applied to the robot 100. When the determiner 140 determines that an adornment is applied to the robot 100, the adornment information acquirer 150 acquires the adornment information indicating that adornment. Thus, since the charging station 310a includes the imager 330, it is possible to capture an image of the appearance of the robot 100 without using a mirror and determine whether an adornment is applied to the robot 100.

Embodiment 3

Next, Embodiment 3 of the present disclosure will be described. In Embodiment 3, as appropriate, descriptions of configurations and functions that are the same as described in Embodiment 1 or 2 are forgone.

Figure 13:
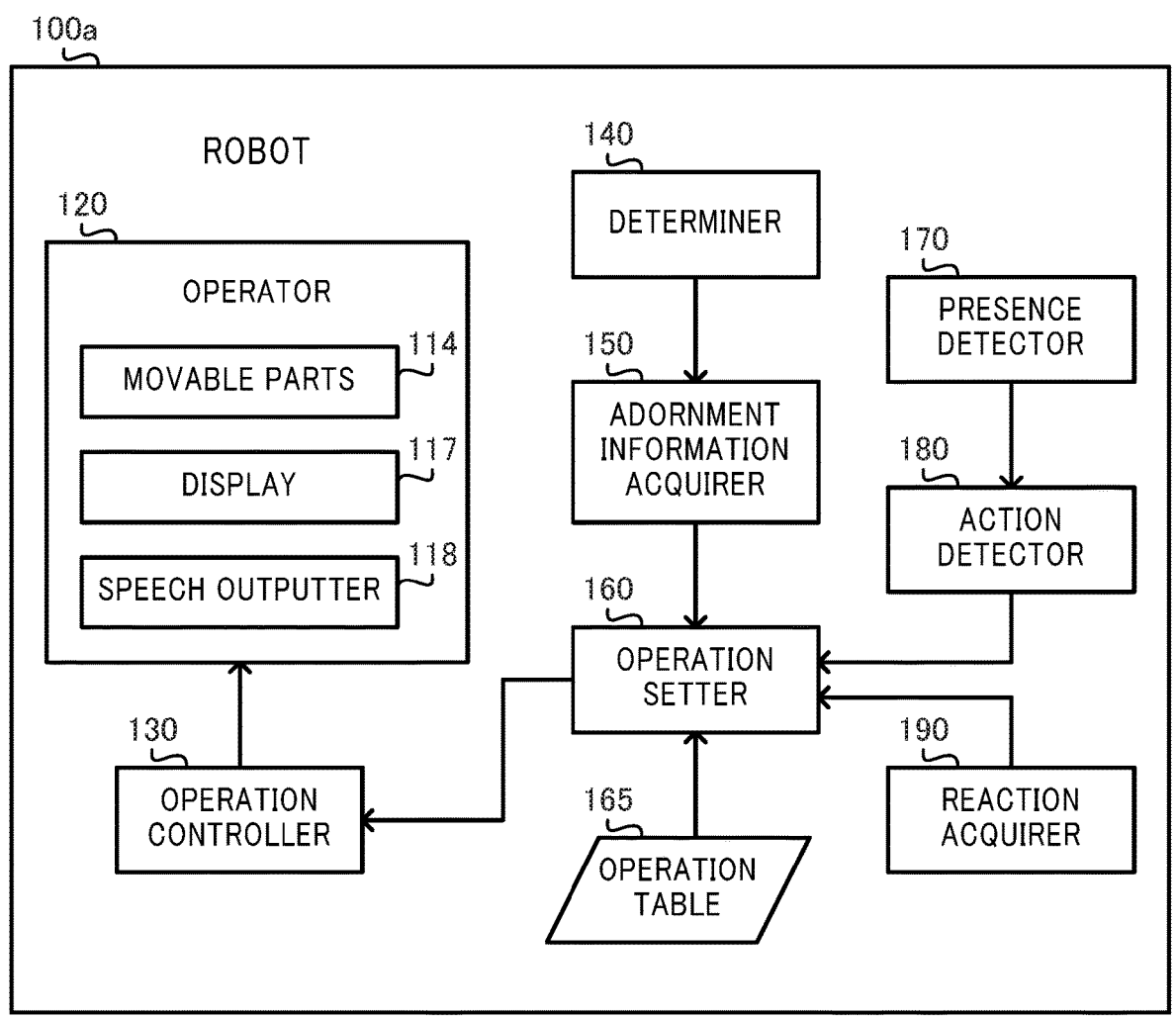
FIG. 13 is a block diagram illustrating the functional configuration of a robot according to Embodiment 3 of the present disclosure.

FIG. 13 illustrates the functional configuration of a robot 100a according to Embodiment 3. As illustrated in FIG. 13, the robot 100a according to Embodiment 3 functionally includes an operator 120, an operation controller 130, a determiner 140, an adornment information acquirer 150, and an operation setter 160. These components function in the same manner as the components described in Embodiment 1 or 2. In addition to these components, the robot 100a according to Embodiment 3 includes a presence detector 170, an action detector 180, and a reaction acquirer 190. In the controller 110, the CPU performs control and reads the program stored in the ROM out to the RAM and executes that program, thereby functioning as the various components described above.

The presence detector 170 detects the presence of the certain target, namely the user or the like, that is present outside the robot 100a. Specifically, the presence detector 170 uses the imager 115a to capture an image of the surroundings of the robot 100a, thereby acquiring an image representing the state of the surroundings of the robot 100a. Then, using the image recognizer 119, the presence detector 170 recognizes the image acquired by the imager 115a and determines wither a human or an animal is captured in the image. Thus, the presence detector 170 is realized by cooperation between the controller 110, the imager 115a, and the image recognizer 119.

The action detector 180 detects an action that the certain target performs on the robot 100a. Here, "an action that the certain target performs on the robot 100a" refers to an action such as conversing or contacting performed by the certain target for the purpose of interacting (communicating) with the robot 100. Examples of actions that the certain target performs on the robot 100a include calling out to the robot 100a, contacting the surface of the robot 100a, or demonstrating a gesture to the robot 100a. The action detector 180 detects such actions performed by the certain target using the various sensors of the sensor section 115.

Specifically, in a case in which the certain target calling out to the robot 100a, the action detector 180 detects, via the sound sensor 115b, the speech uttered by the certain target. In a case in which the certain target contacts the robot 100a, the action detector 180 detects the contact via the contact sensor 115c. In a case in which the certain target demonstrates a gesture to the robot 100a, the action detector 180 detects the gesture via the imager 115a. Thus, the action detector 180 is realized by cooperation between the controller 110 and the various sensors of the sensor section 115.

When the action detector 180 detects an action performed by the certain target on the robot 100a, the operation controller 130 controls the operator 120 to perform an interaction operation for responding to the detected action. The interaction operation is an operation whereby the robot 100a interacts (communicates) with the certain target, and is also called a "response operation" or a "response action".

Specifically, when the action detector 180 detects speech, a contact, a gesture, or the like of the certain target, the operation controller 130 performs the interaction operation by moving the head 101 to face the certain target or moving the feet 108 to move toward the certain target. Alternatively, the operation controller 130 may perform the interaction operation by displaying an image on the display 117 or outputting speech from the speech outputter 118. Thus, the operation controller 130 causes the robot 100a to perform various operations as the interaction operation in response to the actions of the certain target detected by the action detector 180. As a result, the certain target can enjoy communication with the robot 100a.

When the action detector 180 does not detect an action of the certain target on the robot 100a, the operation controller 130 controls the operator 120 to perform a solo operation, which differs from the interaction operation. The solo operation is an operation that the robot 100a performs alone, independent of the certain target, and is a spontaneous operation that does not involve interaction (communication) with the certain target. The solo operation is also called "acting alone" or "playing alone."

In other words, in cases in which the robot 100a interacts with a target present in the surroundings of the robot 100a, the operation controller 130 causes the robot 100a to perform the interaction operation. In cases in which the robot 100a is not interacting with a target present in the surroundings of the robot 100a, the operation controller 130 causes the robot 100a to perform the solo operation. As a result, the robot can be caused to perform natural operations that imitate a real person (child), and the sense of closeness with the robot 100a can be enhanced.

FIG. 14 illustrates examples of the solo operation. When a specified time has elapsed from the most recent detection, by the action detector 180, of an action of the certain target on the robot 100a, the operation controller 130 causes the robot 100a to perform one of the solo operations illustrated in FIG. 14.

Specifically, the operation controller 130 causes the robot 100a to perform different solo operations according to the emotion of the robot 100a. Specifically, as illustrated in FIG. 14, the robot 100a displays four emotions in terms of two emotion values, namely "calm" and "excite." These four emotions are "lonely", "motivated", "happy", and "relaxed." Depending on the action of the certain target in the interaction between the robot 100a and the certain target and other circumstances, the operation controller 130 switches between the two emotion values, thereby changing the emotion of the robot 100a.

For example, when the robot 100a is displaying the emotion of "lonely", the operation controller 130 causes the robot 100a to perform a solo operation such as "Move to a corner of the room as if searching for something and stare." When the robot 100a is displaying the emotion of "motivated," the operation controller 130 causes the robot 100a to perform a solo operation such as "Move to an end of the room and wander around as if wanting to go outside." When the robot 100a is displaying the emotion of "happy," the operation controller 130 causes the robot 100a to perform a solo operation such as "Sing." When the robot 100a is displaying the emotion of "relaxed," the operation controller 130 causes the robot 100a to perform a solo operation such as "Stare out the window." The solo operation to be performed is selected randomly from among the plurality of solo operations available for each emotion. Moreover, the solo operations of the robot 100a may include the adornment operations illustrated in FIG. 6 of Embodiment 1.

While not illustrated in the drawings, the operation controller 130 causes the robot 100a to perform solo operations on the basis of the surrounding environment of the robot 100a or the time. The surrounding environment of the robot 100a is information outside of the robot 100a such as the sound level, the temperature, the atmospheric pressure, the brightness, and obstacles. The surrounding environment is detected by the various sensors of the sensor section 115. The time is information such as the current time, the date, and the season. For example, when a predetermined condition related to the environment such as "The robot 100a hears music via the sound sensor 115b" or "The robot 100a hears a conversation between people via the sound sensor 115b" is satisfied, the operation controller 130 causes the robot 100a to perform the corresponding solo operation. Moreover, when a predetermined condition related to the time such as "It is time for the robot 100a to go to bed" or "It is New Year's or a birthday or the like" is satisfied, the operation controller 130 causes the robot 100a to perform the corresponding solo operation.

The interaction operation and the solo operation are predefined as a part of the operation table 165 stored in the storage unit 111. When the condition of the interaction operation or the solo operation is satisfied, the operation setter 160 references the operation table 165 and sets the interaction operation or the solo operation that the robot 100a will be caused to perform. Then, the operation controller 130 causes the robot 100a to perform the interaction operation or the solo operation set by the operation setter 160.

Returning to FIG. 13, in a case in which the operation controller 130 controls the operator 120 to perform a first operation as the adornment operation while the robot 100a is performing the interaction operation, the reaction acquirer 190 acquires a reaction of the certain target to the first operation. As described above, when the presence of the certain target is detected and also an action of the certain target on the robot 100a is detected, the operation controller 130 causes the robot 100a to perform the interaction operation. Thus, when an adornment is applied to the robot 100a while the robot 100a is performing an interaction operation, the operation controller 130 controls the operator 120 and causes the robot 100a to perform one of the operations illustrated in FIG. 6, for example. When the operation controller 130 causes the robot 100a to perform the adornment operation in this manner, the reaction acquirer 190 acquires the reaction of the certain target to that operation.

Specifically, at a predetermined time after the operation controller 130 has caused the robot 100a to perform the adornment operation, the reaction acquirer 190 acquires the reaction of the certain target by detecting speech uttered by the certain target, contact to the robot 100a by the certain target, or a gesture of the certain target. For example, when the certain target utters speech, the reaction acquirer 190 detects the speech via the sound sensor 115b. When the certain target contacts the robot 100a, the reaction acquirer 190 detects the contact via the contact sensor 115c. When the certain target displays a gesture, the reaction acquirer 190 detects the gesture via the imager 115a. Thus, the reaction acquirer 190 is realized by cooperation between the controller 110 and the various sensors of the sensor section 115.

The operation controller 130 controls the operator 120 to perform a second operation according to the reaction acquired by the reaction acquirer 190. The second operation is different from the first operation. The first operation is an operation that is performed in accordance with the adornment applied to the robot 100a. For example, the first operation is one of the operations defined in the operation table 165 illustrated in FIG. 6. In contrast, the second operation differs from the first operation and is an operation defined in more detail (detailed operation) than the first operation. For example, the second operation is defined as an operation that moves the head 114 more or over a longer period of time than the first operation. Alternatively, the second operation may be defined by a more complex combination of the movable parts 114, the display 117, and the speech outputter 118 than the first operation. As with the first operation, the operation specified as the second operation may vary depending on the adornment applied to the robot 100a, or may vary depending on the reaction of the certain target.

The second operation is predefined together with the first operation as a part of the operation table 165 stored in the storage unit 111, and the operation setter 160 sets the second operation by referencing the operation table 165. The second operation may be defined by an operation program stored in an external device such as the charging station 310 or the charging station 310a, and the operation setter 160 may set the second operation by acquiring the operation program from the external device via wireless communication.

Specifically, when the reaction acquired by the reaction acquirer 190 satisfies a certain condition, the operation setter 160 sets the second operation as the operation that the robot 100a will be caused to perform. Here, the certain condition is satisfied in cases such as when it is found that the reaction of the certain target to the adornment operation is outside an expected range. For example, in a case in which the reaction acquirer 190 detects speech as the reaction of the certain target, the certain condition is satisfied when the loudness of the detected speech is greater than a predefined first threshold. In a case in which the reaction acquirer 190 detects contact with the robot 100a as the reaction of the certain target, the certain condition is satisfied when the strength of the detected contact is greater than a predefined second threshold. Alternatively, in a case in which the reaction acquirer 190 detects a gesture as the reaction of the certain target, the certain condition is satisfied when the intensity of the detected gesture is greater than a predefined third threshold.

Thus, the certain condition is satisfied in cases in which it is found that the reaction of the certain target to the adornment operation is larger than normal. Appropriate values are preset for the first threshold to the third threshold so that the certain conditions are satisfied when the reaction of the certain target is larger than normal.

When the reaction of the certain target satisfies the certain condition, the operation setter 160 sets the second operation, which differs from the adornment operation performed immediately prior, as the operation for the robot 100a to perform. Then, the operation controller 130 controls the operator 120 to perform the second operation set by the operation setter 160. Thus, the entertainment of the robot 100a can be further enhanced by the robot 100a performing additional operations depending on the reaction of the certain target.

Figure 15:
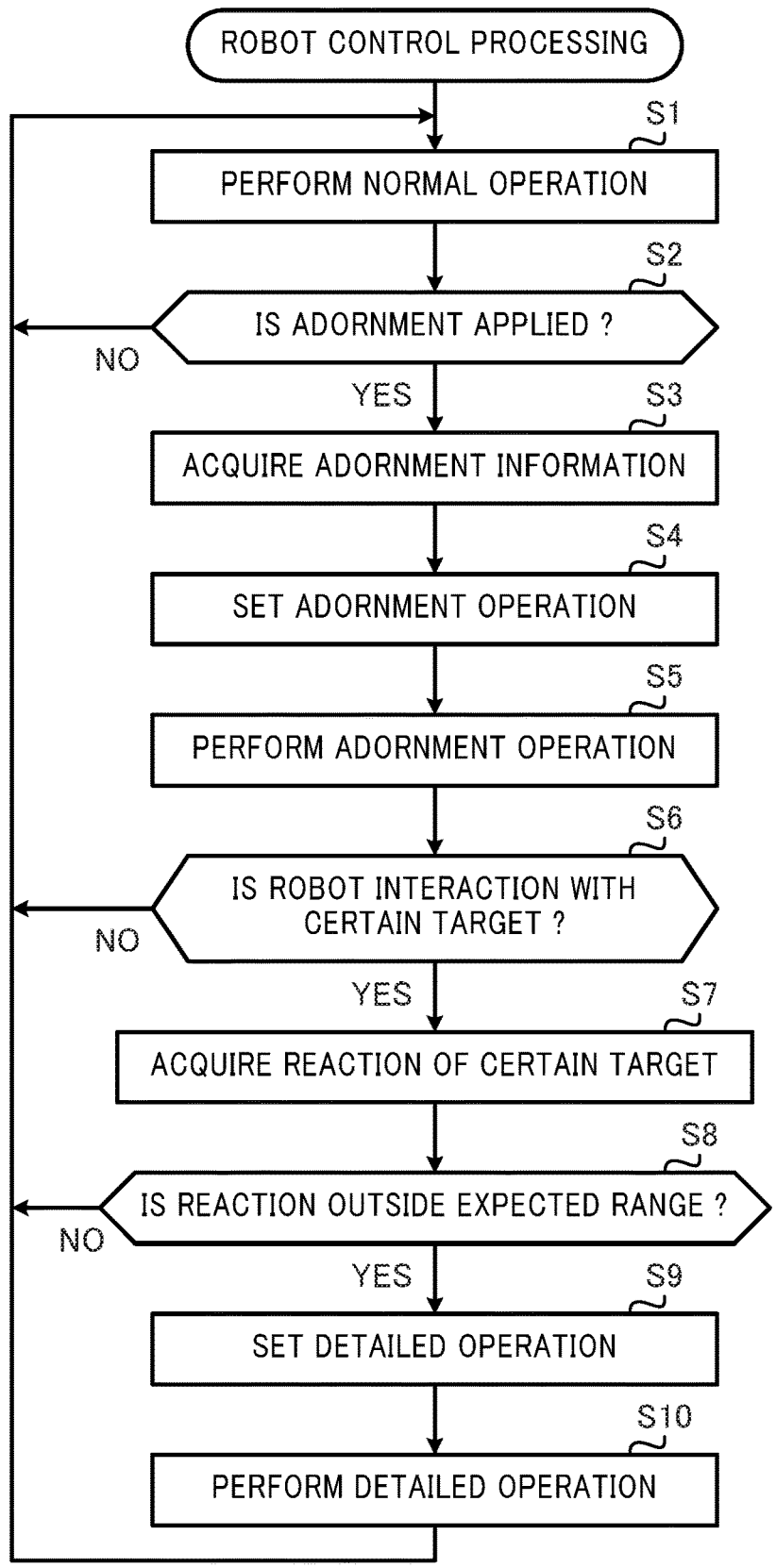
FIG. 15 is a flowchart illustrating the flow of robot control processing executed by the robot according to Embodiment 3.

Next, the flow of the processing executed in the robot 100a configured as described above is described while referencing the flowchart illustrated in FIG. 15.

The robot control processing illustrated in FIG. 15 is started when the robot 100a is placed in a normal operable state. The normal operable state is defined by the power supply of the robot 100a being turned ON and the battery 112 being charged.

In the robot control processing illustrated in FIG. 15, the processing of step S1 to step S5 is the same as the processing of step S1 to step S5 of the robot control processing of Embodiment 1 illustrated in FIG. 9. Specifically, the controller 110 causes the operator 120 to execute the normal operation (step S1) and, meanwhile, the controller 110 determines whether an adornment is applied to the robot 100a (step S2). When, as a result of the determination, the controller 110 determines that an adornment is not applied to the robot 100a (step S2; NO), the controller 110 remains at step S1 and continues to cause the operator 120 to execute the normal operation. In contrast, when the controller 110 determines that an adornment is applied to the robot 100a (step S2; YES), the controller 110 acquires the adornment information indicating the adornment applied to the robot 100a (step S3). When the controller 110 acquires the adornment information, the controller 110 sets the adornment operation corresponding to the adornment applied to the robot 100a (step S4), and causes the robot 100a to perform the set adornment operation (step S5).

When the robot 100a is caused to perform the adornment operation in this manner, the controller 110 functions as the presence detector 170 and the action detector 180 and determines whether the robot 100a is interacting with the certain target (step S6). Specifically, when the presence of the certain target is detected and also an action of the certain target on the robot 100a is detected, the controller 110 causes the robot 100a to perform the interaction operation to respond to the action of the certain target. Meanwhile, when the presence of the certain target is detected but an action of the certain target on the robot 100a is not detected, the controller 110 causes the robot 100a to perform the solo operation, which is an operation that is independent from the certain target. The controller 110 determines that the robot 100a is interacting with the certain target when the robot 100a is performing the interaction operation of the two types of operations, or when the current timing is between the performance of the interaction operation and the performance of a subsequent solo operation.

When, as a result of the determination, the controller 110 determines that the robot 100a is not interacting with the certain target (step S6; NO), the controller 110 skips the subsequent steps and returns to step S1. In contrast, when it is determined that the robot 100a is interacting with the certain target (step S6; YES), the controller 110 functions as the reaction acquirer 190 and acquires the reaction of the certain target to the adornment operation performed in step S5 (step S7). Specifically, at a predetermined time immediately after the adornment operation is performed, the controller 110 detects speech uttered by the certain target, contact to the robot 100a by the certain target, or a gesture of the certain target.

When the reaction of the certain target is acquired, the controller 110 determines whether the acquired reaction is outside the expected range (step S8). Specifically, the controller 110 determines whether the loudness of the speech, the strength of the contact, or the intensity of the gesture acquired as the reaction to the adornment operation is larger than a predefined threshold.

When the controller 110 determines that the reaction of the certain target is outside the expected range (step S8; YES), the controller 110 functions as the operation setter 160 and sets the detailed operation (step S9). Specifically, the controller 110 sets, as the operation to cause the robot 100a to perform, an operation that differs from the adornment operation that the robot 100a is caused to perform in step S5.

When the controller 110 sets the detailed operation, the controller 110 functions as the operation controller 130 and causes the robot 100a to perform the set detailed operation (step S10). Specifically, the controller 110 controls the movable parts 114, the display 117, or the speech outputter 118 and causes the robot 100a to perform the detailed operation that corresponds to the reaction of the certain target.

In contrast, when the controller 110 determines that the reaction of the certain target is within the expected range (step S8; NO), the controller 110 skips the processing of step S9 and step S10 and does not cause the robot 100a to perform the detailed operation.

Thereafter, the controller 110 returns to the processing of step S1 and repeats the processing of steps S1 to S10. In other words, each time an adornment is applied to the robot 100a while the robot 100a is performing the normal operation, the controller 110 repeats the processing that causes the robot 100a to perform an operation corresponding to that adornment and further perform a more detailed operation corresponding to the reaction of the certain target.

As described above, when the robot 100a according to Embodiment 3 performs the adornment operation while interacting with the certain target, the robot 100a performs an operation that corresponds to the reaction of the certain target to that adornment operation, and this operation differs from the adornment operation. Thus, the robot 100a according to Embodiment 3 not only performs the operation corresponding to the adornment applied to the robot 100a, but also performs the operation to respond to the reactions of the certain target. As a result, the robot 100a can entertain the user and enhance the entertainment even further.

In Embodiment 3, the adornment operation when the robot 100a is performing an interaction operation and the adornment operation when the robot 100a is performing a solo operation may differ even if the adornment applied to the robot 100a when the robot 100a performs the interaction operation and the adornment applied to the robot 100a when the robot 100a performs the solo operation are same. For example, while the robot 100a is performing the interaction operation, the operation controller 130 may cause the robot 100a to perform, as the adornment operation, an operation to which the certain target is more likely to react. Additionally, while the robot 100a is performing the solo operation, the operation controller 130 may cause the robot 100a to perform the adornment operation as a part of the solo operation. Thus, the robot 100a is caused to perform, as the adornment operation, an operation that matches the situation, according to whether the robot 100a is performing the interaction operation or the solo operation. As a result, the entertainment of the robot 100a can be further enhanced.

Modified Examples

Embodiments of the present disclosure are described above, but these embodiments are merely examples and do not limit the scope of application of the present disclosure. That is, various applications of the embodiments of the present disclosure are possible, and all embodiments are included in the scope of the present disclosure.

For example, in the embodiments described above, the operation setter 160 sets the adornment operation on the basis of the operation table 165 that is stored, in advance, in the robot 100 or the robot 100a. However, in the present disclosure, a configuration is possible in which the operation setter 160 acquires, using the functions of the wireless communicator 116, a program in which the adornment operation is defined from an external device. For example, the operation setter 160 may wirelessly communicate with the charging station 310 or the charging station 310a in response to an adornment being applied to the robot 100 or the robot 100a, and acquire, from the charging station 310 or the charging station 310a, a program in which the operation corresponding to that adornment is defined. Alternatively, the operation setter 160 may communicate with an external server, via an internet or similar broadband network, in response to an adornment being applied to the robot 100 or the robot 100a, and acquire, from the external server, a program in which the operation corresponding to that adornment is defined. Moreover, a program in which the operation corresponding to that adornment is defined may be incorporated, in advance, into an IC tag in the adornment. In this case, when the adornment is applied to the robot 100 or the robot 100a, the operation setter 160 receives a radio signal emitted by the IC tag to acquire the program in which the operation corresponding to that adornment is defined.

The operation controller 130 may cause the robot 100 or the robot 100a to perform various adornment operations other than the operations illustrated in FIG. 6. Furthermore, a configuration is possible in which a plurality of adornment operations are associated with each adornment. In such a case, the operation controller 130 selects, from the plurality of adornment operations that correspond to the adornment applied to the robot 100 or the robot 100a, an adornment that is executable based on the current charge amount of the battery 112, and causes the robot 100 or the robot 100a to perform the selected adornment operation.

In the embodiments described above, the robot 100 or the robot 100a includes the determiner 140 that determines whether an adornment is applied to the robot 100 or the robot 100a. However, in the present disclosure, a configuration is possible in which an external device, separate from the robot 100 or the robot 100a, is provided with the functions of the determiner 140. Examples of the external device include the charging station 310 or the charging station 310a and the communication terminal 250. In this case, the external device includes a configuration that corresponds to the controller 110, the image recognizer 119, and the like. The external device determines the adornment applied to the robot 100 or the robot 100a on the basis of the captured image 200 in which the appearance of the robot 100 or the robot 100a is captured. In the robot 100, the adornment information acquirer 150 acquires, as the adornment information, determination results determined by the external device. The determination results are acquired by communicating with the external device via the wireless communicator 116. Thus, the configuration of the robot 100 or the robot 100a can be simplified by providing the external device with the functions of the determiner 140.

In the embodiments described above, the robot 100 or the robot 100a is a robot that imitates a human. However, the robot 100 or the robot 100a according to the present disclosure is not limited to a shape that imitates a human and may have any shape. For example, the robot 100 or the robot 100a according to the present disclosure may be a robot having an appearance that imitates an animal (pet) such as a dog, a cat, a mouse, and a rabbit.

In the embodiments described above, the display 117 is provided in the eyes 104, and the imager 115a is provided in the mouth 105. However, in the present disclosure, the display 117 may be provided at a location other than the eyes 104, and the imager 115a may be provided at a location (for example, the nose) other than the mouth 105.

In the embodiments described above, in the controller 110, the CPU executes the program stored in the ROM, thereby functioning as the various components illustrated in FIG. 3. However, in the present disclosure, the control unit 110 may include, for example, an Application Specific Integrated Circuit (ASIC), a Field-Programmable Gate Array (FPGA), various control circuitry, or other dedicated hardware instead of the CPU, and this dedicated hardware may function as the various components illustrated in FIG. 3. In this case, the functions of each of the components may be realized by individual pieces of hardware, or the functions of each of the components may be collectively realized by a single piece of hardware. Additionally, the functions of each of the components may be realized in part by dedicated hardware and in part by software or firmware. Note that, the constituents that execute the various functions, including these dedicated pieces of hardware and the CPU, can be collectively referred to as a processor.

It is possible to provide a robot provided in advance with the configurations for realizing the functions according to the present disclosure, but it is also possible to apply a program to cause an existing information processing apparatus or the like to function as the robot according to the present disclosure. That is, a configuration is possible in which a CPU or the like that controls an existing information processing apparatus or the like is used to execute a program for realizing the various functional components of the robot 100 or the robot 100a described in the foregoing embodiments, thereby causing the existing information processing apparatus to function as the robot according to the present disclosure.

Any method may be used to apply the program. For example, the program can be applied by storing the program on a non-transitory computer-readable recording medium such as a flexible disc, a compact disc (CD) ROM, a digital versatile disc (DVD) ROM, and a memory card. Furthermore, the program can be superimposed on a carrier wave and applied via a communication medium such as the internet. For example, the program may be posted to and distributed via a bulletin board system (BBS) on a communication network. Moreover, a configuration is possible in which the processing described above is executed by starting the program and, under the control of the operating system (OS), executing the program in the same manner as other applications/programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A robot, comprising:
   an operator configured to cause the robot to operate; and
   a processor;
   wherein the processor:
   acquires adornment information indicating an adornment that is applied to the robot, the adornment information being obtained based on a captured image of the robot,
   controls the operator to perform a first operation corresponding to the acquired adornment information,
   acquires, after controlling the operator to perform the first operation, a reaction of a certain target to the first operation,
   controls the operator to perform a second operation when an intensity of the acquired reaction is greater than a predefined threshold, the second operation being different from the first operation and being an operation in which the robot moves more or over a longer period of time than in the first operation,
   controls the operator not to perform the second operation when the intensity of the acquired reaction is not greater than the predefined threshold,
   detects an action of the certain target performed to the robot,
   controls the operator to perform an interaction operation to respond to the action when the processor detects the action, and
   controls the operator to perform a spontaneous solo operation when the processor does not detect the action, the solo operation being performed by the robot alone independently from the certain target, the solo operation being based on an emotion state of the robot and not involving interaction with the certain target.

2. The robot according to claim 1, further comprising:
   an imager configured to capture the image of the robot,
   wherein the processor acquires the adornment information based on the image of the robot captured by the imager.

3. The robot according to claim 2, wherein the imager captures a mirror image of the robot that is reflected in a mirror.

4. The robot according to claim 3, wherein:
   the operator causes the robot to move, and
   when the operator causes the robot to move to a position where the mirror is provided, the imager captures the mirror image of the robot that is reflected in the mirror.

5. The robot according to claim 4, wherein:
the mirror is provided on a charging station that charges the robot, and
the imager captures the image of the robot via the mirror while the robot is charged by the charging station.

6. The robot according to claim 1, wherein the processor:
determines whether or not the adornment is applied to the robot, and
acquires the adornment information when a determination is made that the adornment is applied to the robot.

7. The robot according to claim 1, wherein:
an external device located external to the robot determines, based on the captured image of the robot, the adornment applied to the robot, and
the processor acquires, from the external device, determination results determined by the external device as the adornment information.

8. The robot according to claim 1, wherein the solo operation includes an operation corresponding to the adornment information.

9. The robot according to claim 1, wherein the certain target is a human or an animal.

10. The robot according to claim 1, wherein the adornment of the robot includes a costume or an accessory.

11. The robot according to claim 1, wherein an adornment operation when the robot performs the interaction operation and an adornment operation when the robot performs the solo operation are different from each other, even if the adornment applied to the robot when the robot performs the interaction operation is the same as the adornment applied to the robot when the robot performs the solo operation.

12. The robot according to claim 11, wherein while the robot performs the interaction operation, the processor causes the robot to perform, as the adornment operation, an operation which is more likely to cause the certain target to react as compared to the adornment operation performed by the robot as a part of the solo operation.

13. A robot control system, comprising:
the robot according to claim 1; and
a charging station that charges the robot.

14. The robot control system according to claim 13, wherein:
the charging station comprises:
a station-side imager that captures the image of the robot; and
a transmitter that sends the image of the robot captured by the station-side imager to the robot,
the robot further comprises a receiver that receives the captured image sent from the charging station, and
the processor acquires the adornment information based on the captured image received by the receiver.

15. A robot control method, comprising:
acquiring adornment information indicating an adornment that is applied to a robot, the adornment information being obtained based on a captured image of the robot;
controlling the robot to perform a first operation corresponding to the acquired adornment information;
acquiring, after controlling the robot to perform the first operation, a reaction of a certain target to the first operation;
controlling the robot to perform a second operation when an intensity of the acquired reaction is greater than a predefined threshold, the second operation being different from the first operation and being an operation in which the robot moves more or over a longer period of time than in the first operation,
controlling the robot not to perform the second operation when the intensity of the acquired reaction is not greater than the predefined threshold,
detecting an action of the certain target performed to the robot,
controlling the robot to perform an interaction operation to respond to the action when the processor detects the action, and
controlling the robot to perform a spontaneous solo operation when the processor does not detect the action, the solo operation being performed by the robot alone independently from the certain target, the solo operation being based on an emotion state of the robot and not involving interaction with the certain target.

16. A non-transitory computer-readable storage medium storing a program executable by a computer of a robot, the robot having an operator that causes the robot to operate, and the program being executable to control the computer to perform processes comprising:
acquiring adornment information indicating an adornment that is applied to the robot, the adornment information being obtained based on a captured image of the robot;
controlling the operator to perform a first operation corresponding to the acquired adornment information;
acquiring, after controlling the operator to perform the first operation, a reaction of a certain target to the first operation;
controlling the operator to perform a second operation when the acquired reaction is greater than a predefined threshold, the second operation being different from the first operation and being an operation in which the robot moves more or over a longer period of time than in the first operation,
controlling the operator not to perform the second operation when the intensity of the acquired reaction is not greater than the predefined threshold,
detecting an action of the certain target performed to the robot,
controlling the operator to perform an interaction operation to respond to the action when the processor detects the action, and
controlling the operator to perform a spontaneous solo operation when the processor does not detect the action, the solo operation being performed by the robot alone independently from the certain target, the solo operation being based on an emotion state of the robot and not involving interaction with the certain target.

* * * * *